G. HOEPNER.
BAG FILLING MACHINE.
APPLICATION FILED FEB. 15, 1912.
1,058,747.
Patented Apr. 15, 1913.
8 SHEETS—SHEET 1.
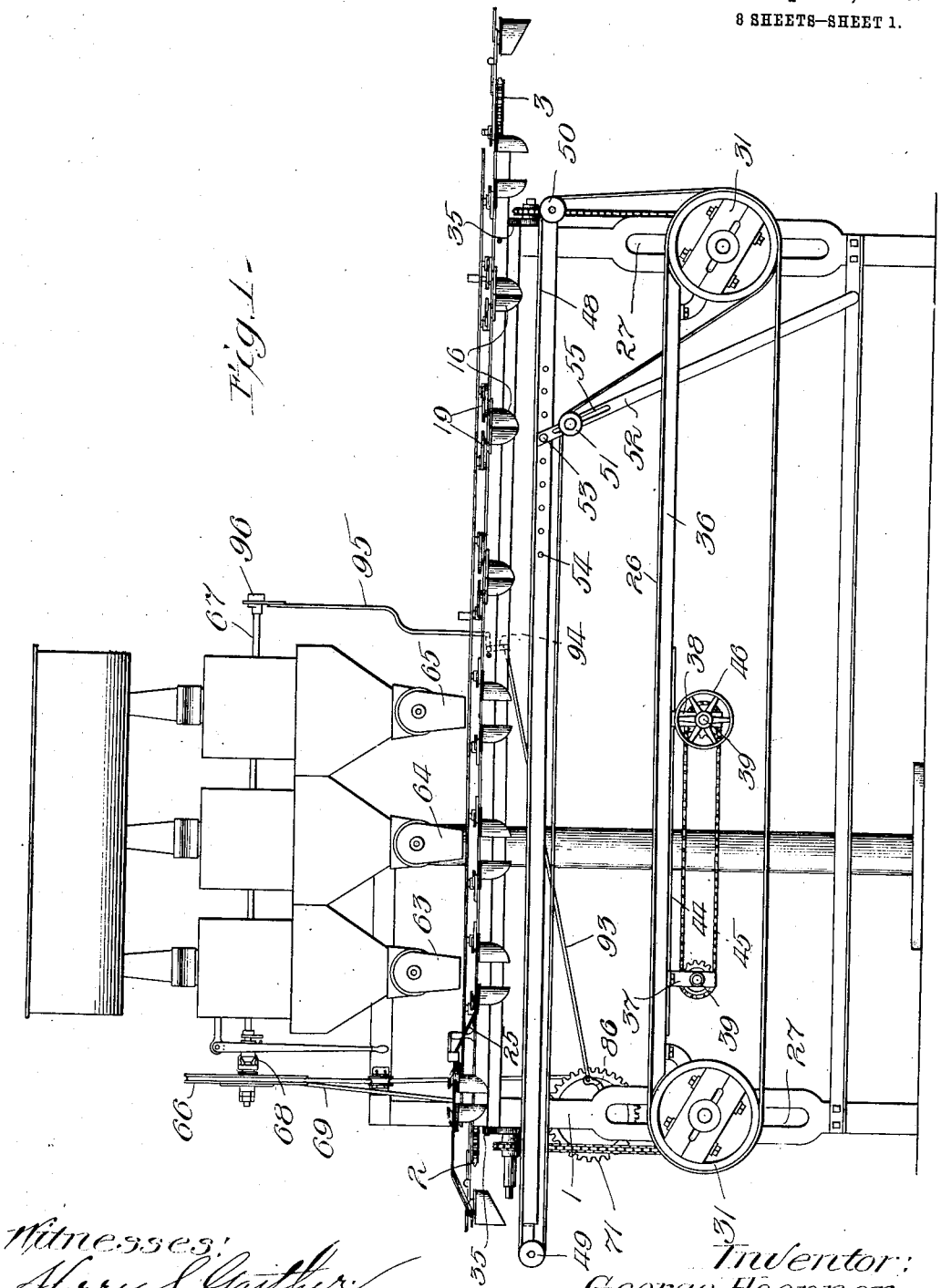
Witnesses:
Harry S. Gaither
Ruby V. Brydges.
Inventor:
George Hoepner
by Chamberlin & Freudenreich,
Attys G. HOEPNER.
BAG FILLING MACHINE.
APPLICATION FILED FEB. 15, 1912.
1,058,747.
Patented Apr. 15, 1913.
8 SHEETS—SHEET 2.
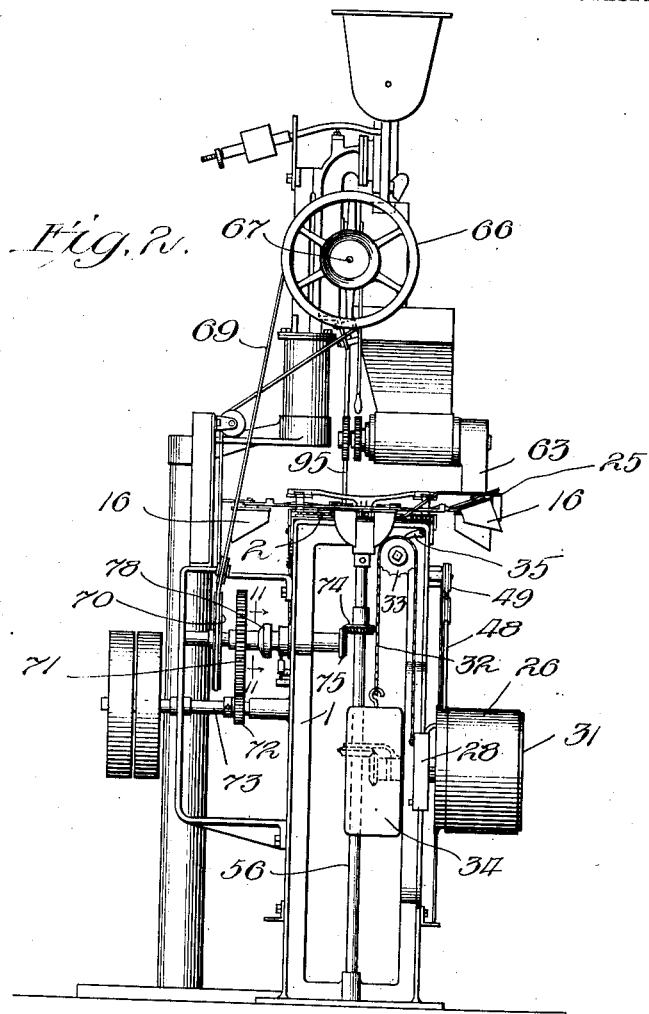
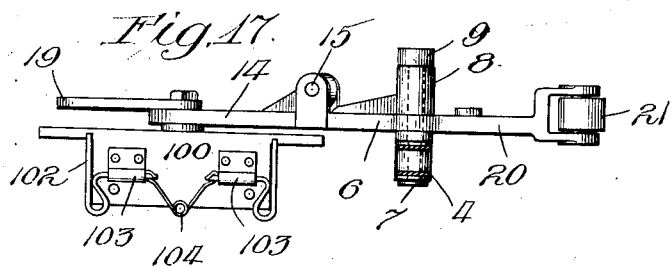

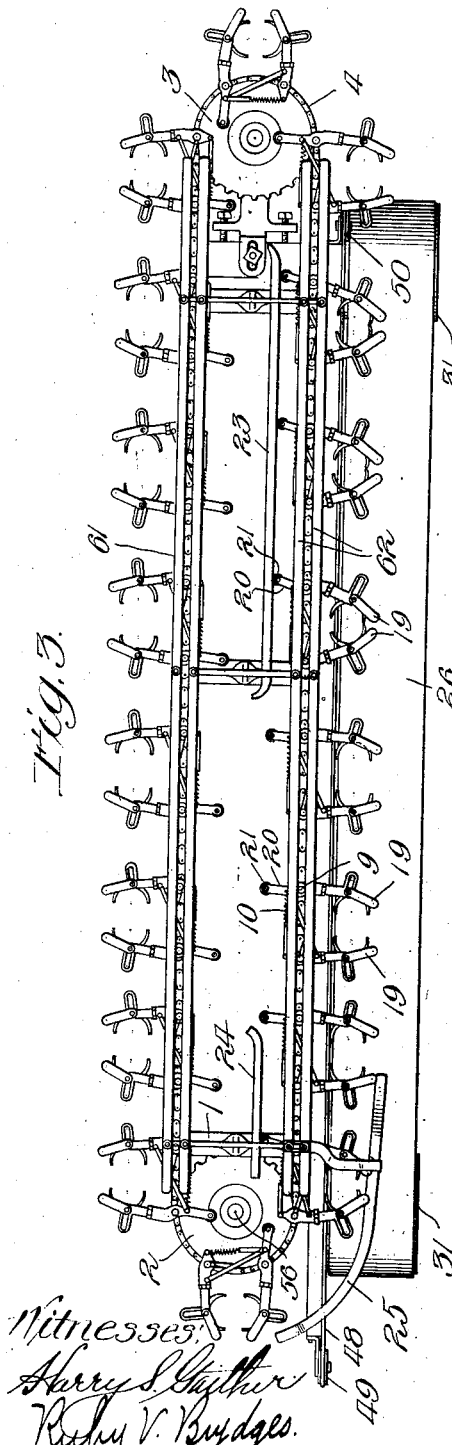

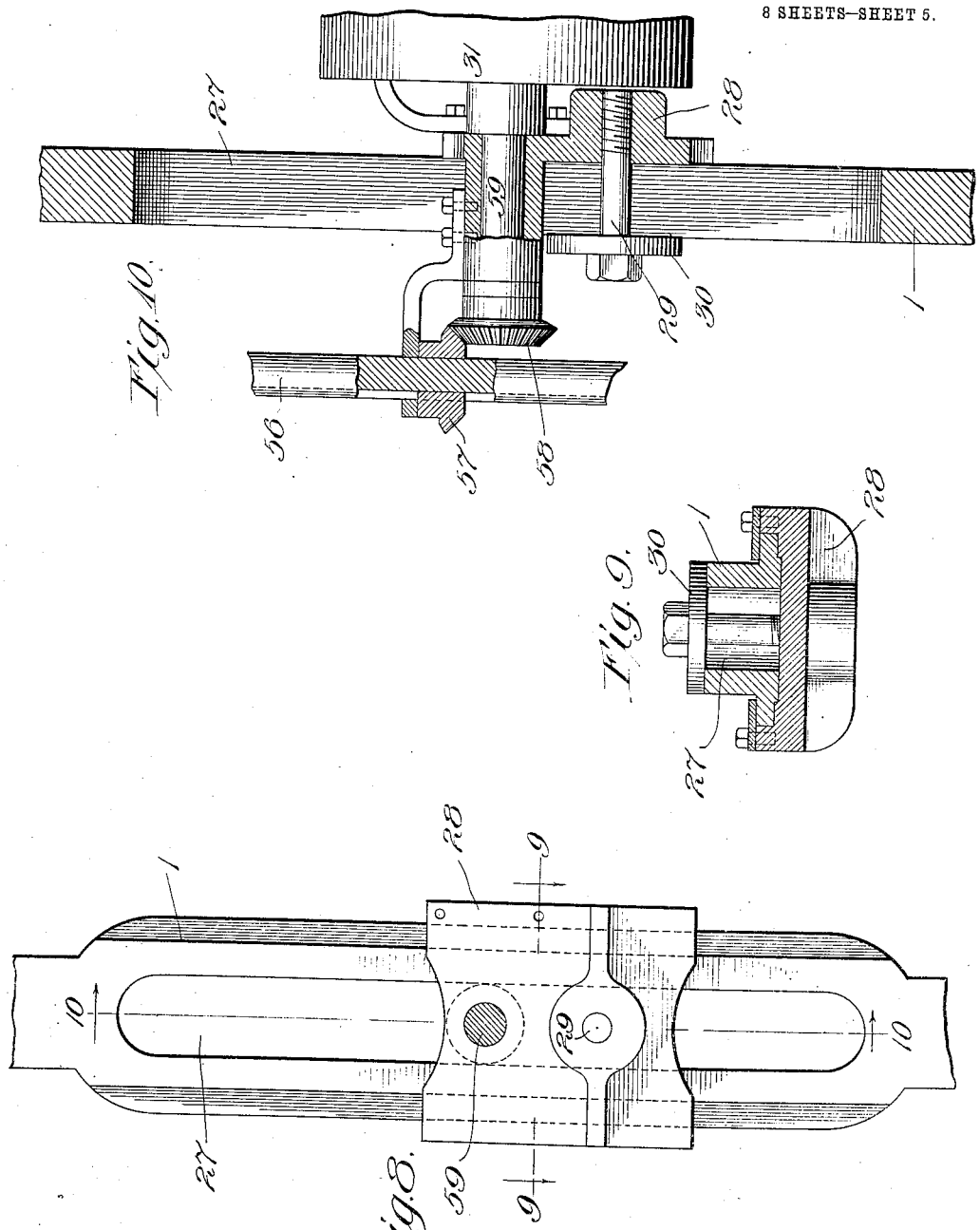

G. HOEPNER.
BAG FILLING MACHINE.
APPLICATION FILED FEB. 15, 1912.

1,058,747.

Patented Apr. 15, 1913.
8 SHEETS—SHEET 6.

Witnesses:
Harry S. Gaither
Ruby V. Brydges

Inventor:
George Hoepner
by Chamberlin Freudenreich
Attys

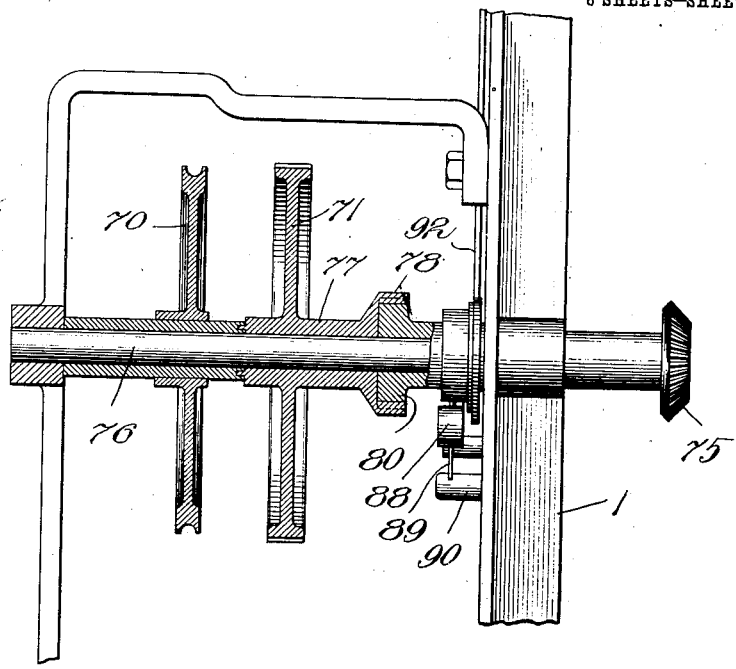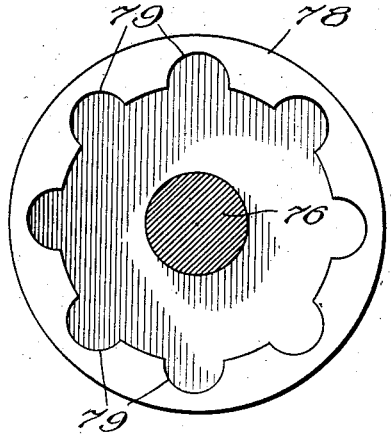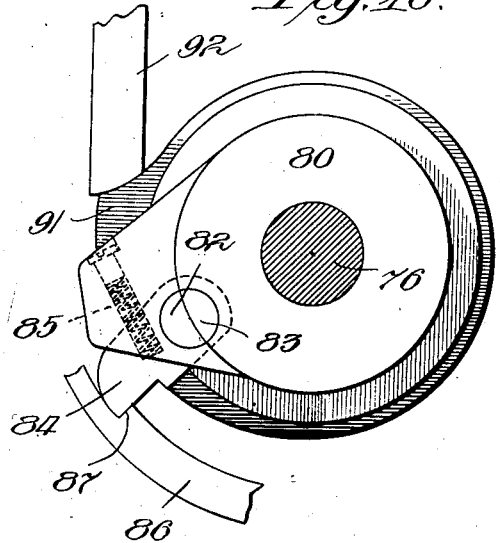

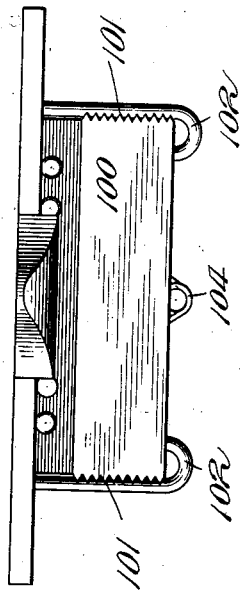
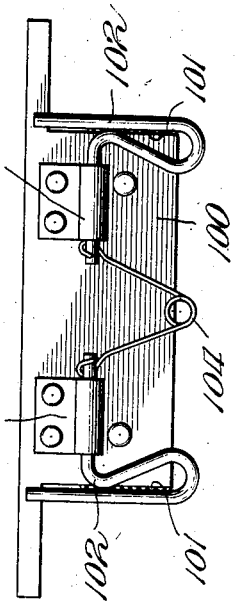
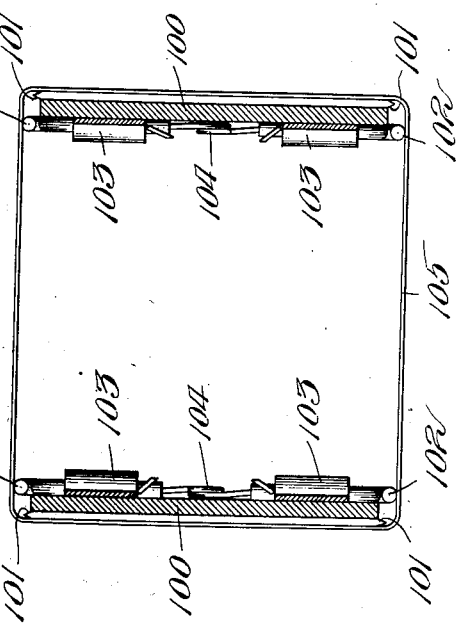
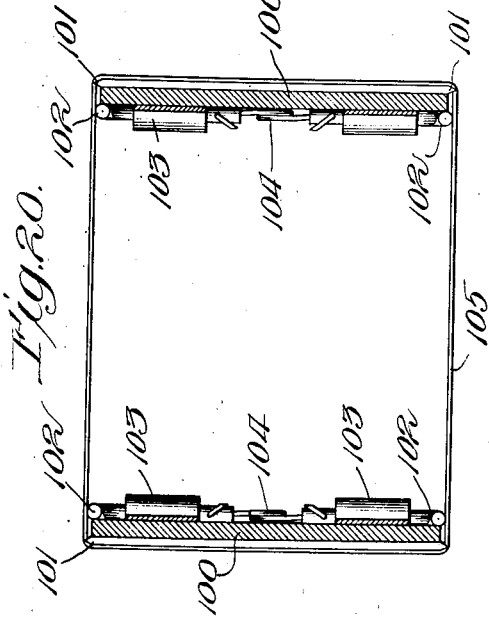

UNITED STATES PATENT OFFICE.

GEORGE HOEPNER, OF CHICAGO, ILLINOIS.

BAG-FILLING MACHINE.

1,058,747.
Specification of Letters Patent.
Patented Apr. 15, 1913.

Application filed February 15, 1912. Serial No. 677,694.

*To all whom it may concern:*

Be it known that I, GEORGE HOEPNER, a citizen of the United States, residing at Chicago, county of Cook, State of Illinois, have invented a certain new and useful Improvement in Bag-Filling Machines, and declare the following to be a full, clear, and exact description of the same, such as will enable others skilled in the art to which it pertains to make and use the same, reference being had to the accompanying drawings, which form a part of this specification.

My invention has for its object to produce a simple and reliable mechanism for holding collapsible bags in an expanded condition, conveying the bags past a filling machine, and then releasing the filled bags.

A further object of my invention is to produce a simple and effective device for holding a collapsible bag expanded.

A further object of my invention is to produce a simple and novel arrangement capable of handling various sizes of collapsible bags so as to fill them automatically and carry them away after they have been slipped upon suitable holding devices.

Figure 7:
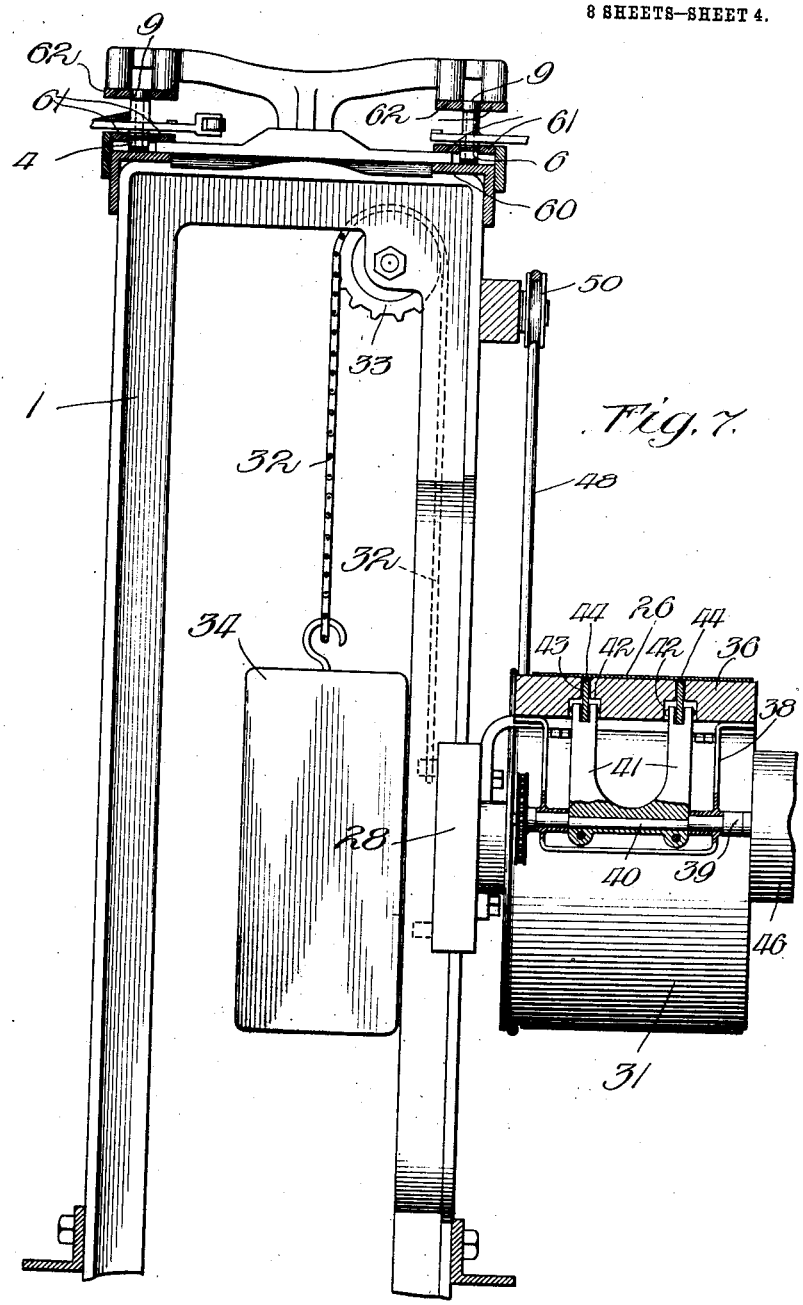
Figure 11:
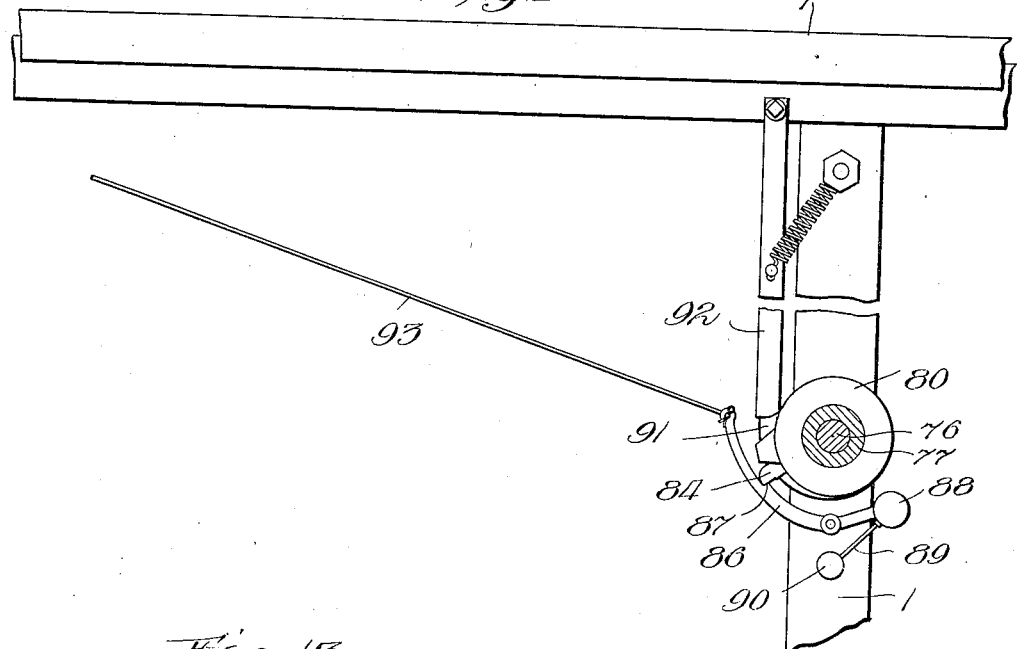
Figure 13:
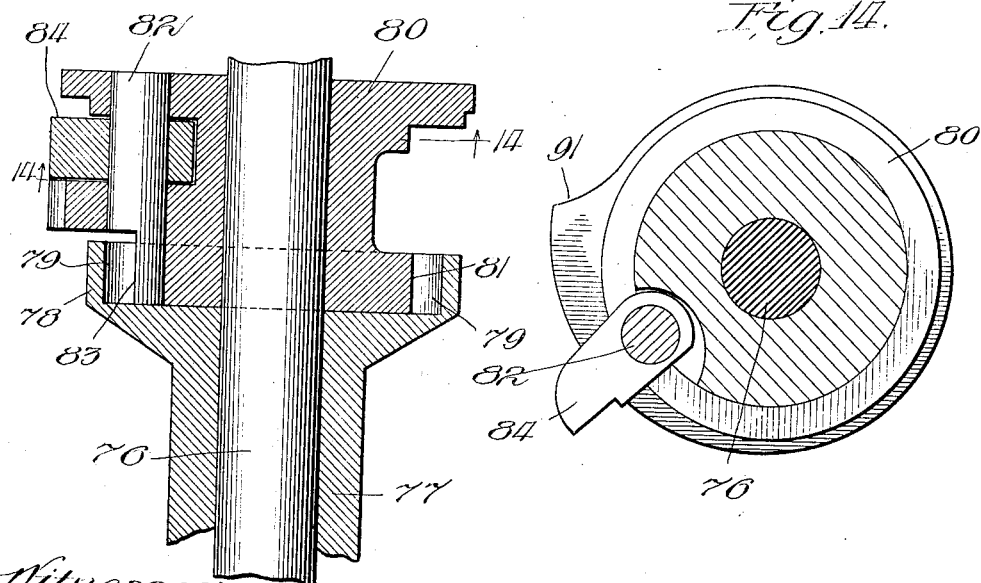
Figure 14:
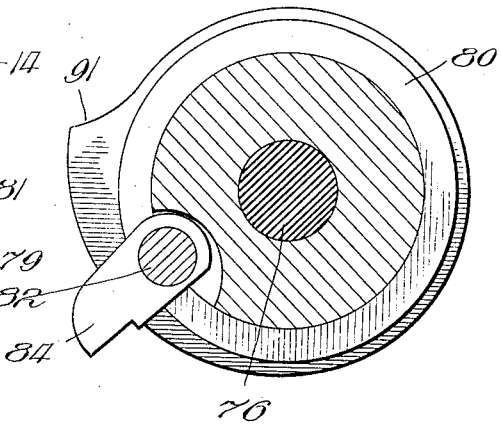

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front elevation of a machine arranged in accordance with a preferred form of my invention; Fig. 2 is an end view looking toward the right in Fig. 1; Fig. 3 is a top plan view of the conveying and supporting means for the bags; Fig. 4 is a top plan view on an enlarged scale of one of the bag-holding devices; Fig. 5 is a side view of the device shown in Fig. 4; Fig. 6 is a sectional view of an adjusting collar or sleeve to be applied to the holding device; Fig. 7 is a view partly in end elevation and partly in section of the bag-supporting means; Fig. 8 is a detail showing one of the adjustable supports for the bag-supporting belt; Fig. 9 is a section on line 9—9 of Fig. 8; Fig. 10 is a section taken on line 10—10 of Fig. 8, portions of the supporting belt and driving means therefor being shown; Fig. 11 is a section on an enlarged scale on line 11—11 of Fig. 2; Fig. 12 is a view partly in elevation and partly in section of the transmission and clutch between the main driving shaft and the weighing and filling mechanism; Fig. 13 is a section on an enlarged scale through the main clutch; Fig. 14 is a section on line 14—14 of Fig. 13; Fig. 15 is an end view of the driving member of the clutch; Fig. 16 is a side elevation of the complete clutch and controlling dogs; Fig. 17 is a side view of a modified form of bag holder, adapted for holding bags of cloth or the like; Figs. 18 and 19 are views looking at opposite sides of one of the bag-engaging members shown in Fig. 17; and Figs. 20 and 21 are cross sections through one of the bag-holding devices shown in Fig. 17, with a bag in position, the views showing the bag respectively in a stretched and in an unstretched or releasing position.

My invention relates principally to the means for handling a bag or series of bags to be filled, such means being adapted to be associated with a machine for weighing or otherwise separating a mass of material to be packaged into units capable of being held by individual bags. Where the means for handling the bags is associated with an automatic weighing or measuring machine it is preferably controlled by the machine so that the two work in harmony and cause the bags to be filled automatically after they have been placed in position on the mechanism for handling them. I have therefore illustrated my invention as connected with an automatic weighing machine and, for the sake of brevity, shall confine the detailed description to this embodiment; it being understood, however, that the various features of my invention are adapted to other and more varied applications than the particular application illustrated.

Referring to the drawings, 1 represents a suitable framework or structure for supporting the various mechanism for handling bags of various kinds. On the upper side of the frame structure, at opposite ends thereof, are sprocket wheels 2 and 3 mounted so as to revolve about vertical axes, either or both of the sprocket wheels being driven from a suitable source of power. Passing around the sprocket wheels is an endless sprocket chain 4 which constitutes the main conveyer. It will of course be understood that the conveyer may be variously constructed, although a sprocket chain, because of its positive action, is a desirable form. On the conveyer I mount a series of bag-holding devices which may be either of the kind illustrated in detail in Figs. 4 and 5 or the kind illustrated in Figs. 17 to 21. The first form is best adapted for paper bags and the other for bags of cloth or the like. Since I have illustrated the machine as containing holding devices of the first form, I shall describe this device in connection with the machine, afterward describing the other device.

Specifically considered, each bag-holding device comprises two arms or members, 5 and 6, each pivotally connected between its ends to the sprocket chain so as to extend transversely thereof and be capable of moving angularly about a vertical axis. The connection between the arms and the chain may conveniently be effected by elongating some of the pins or trunnions 7 which connect the links of the chain together so as to permit them to project above the chain. Each of the arms may be provided with a hub 8 surrounding the trunnion extensions and giving a bearing of considerable length. Suitable nuts or collars 9 may be placed upon the trunnion extensions above the hubs so as to hold the arms in place. The inner ends of the arms are connected together by a suitable spring device 10 which tends to draw the inner ends of the arms together and draw the outer ends apart. A suitable stop may be provided for limiting the movement of the arms through the action of the spring. In the arrangement shown, there is a link 11 pivotally connected at one end to the outer end of the arm 5 and at its other end to the inner end of the arm 6. On this link is a finger or projection 12 which normally abuts against the hub 8 on the arm 5 and limits the movement of the inner ends of the arms toward each other. The stop device may be made adjustable, this being conveniently accomplished by providing a suitable sleeve 13 (see Figs. 4 and 6) which may be slipped down over the hub on the arm 5, the stop member engaging with the sleeve instead of with the hub. By providing sleeves of various diameters, any desired adjustment may be obtained. Hinged to the outer end of each of the arms 5 and 6 is a member 14, the hinges 15 being so constructed that the members 14 are adapted to be swung vertically from their normal horizontal position of rest. On the members 14 are suitable bag-engaging devices, these being preferably adjustable so as to adapt the holders to bags of various sizes. In the arrangement shown, each of the bag-engaging devices consists of a semi-cylindrical shell 16 fastened at one end, midway between the side edges, to the corresponding hinged member. This connection may take various forms, that illustrated in the drawings comprising a stud 17 passing through a slot 18 in the corresponding hinged member, the slot being elongated in the direction of the length of the chain. When the studs are screwed in place the bag-engaging devices are rigidly locked to the hinged arm members, the normal distance between the devices depending upon the size of the bag to be held thereby, and the adjustment for different sized bags being obtained by sliding the studs along the slots. The studs may also be used to hold upon the swinging arm members lifting fingers 19 which are adapted to be engaged by a cam, as will hereinafter be explained, for lifting the hinged members and the bag-engaging devices carried thereby. The inner end of one of the pivoted arms, the arm 6 in the arrangement shown, is provided with a backward extension 20 having a suitable roller 21 upon its extreme inner end, this roller being adapted to engage a cam, as will hereinafter be described, for the purpose of swinging the arms and bringing the bag-engaging devices closer to each other. I prefer to shape the bag-engaging devices in such a manner that when they are pressed together they form a wedge-like member which can readily enter the mouth of a folded bag. This may conveniently be accomplished by making the lower edges diagonal as indicated at 22, the outer edge of each of the members being longer than the inner edge so that when the two outer edges are brought together a wedge is produced with its point at the lower ends of the outer edges.

Unless restrained from doing so, the bag-holding devices assume the positions shown along the top of Fig. 3, thus holding a bag which has been slipped upon one set of bag-engaging devices in an expanded condition. When the holders are in this condition the fingers 19 may be grasped so as to collapse them and permit the bags to be placed on them easily. The same result may be accomplished automatically by providing a suitable cam device which will engage with the rollers 21, causing the inner ends of the arms to be swung apart and the outer ends to be swung toward each other. In the drawings, (see Fig. 3) I have shown such a cam device at 23, it being arranged at the right hand end of the machine behind the front half of the chain and being long enough to engage simultaneously with three of the rollers, thus collapsing three of the holders simultaneously so as to permit bags to be placed thereon by the simple process of inserting the wedge-like bag-engaging members into the mouths of the bags. If desired, the cam may of course be placed at some other point and be either longer or shorter than as illustrated, the arrangement which I have shown being simply one which is satisfactory for a machine in which three bags are filled simultaneously, as will be hereinafter described, permitting a person standing in front of the machine to place the bags in position while watching the bags which are being filled. Near the left hand end of the conveyer is a second stationary cam, 24, which is adapted to engage with the cam rollers on the bag holders and partially collapse the holders when they reach this point. In front of the conveyer, at the left hand side of the machine is another cam, 25, its upper face being inclined and being adapted to engage with the lifting fingers 19 on the holders so as to swing the hinged arm members 14 upwardly and lift the bag-engaging devices out of the bags; the cams 24 and 25 being so disposed with relation to each other that the lifting of the bag-engaging devices does not take place until the holders have been collapsed sufficiently to release the tension on the bags.

Assuming that one of the sprocket wheels is driven in some manner, so as to cause the sprocket chain or conveyer to travel: it will be seen that as one holder after the other approaches the cam 23 it is collapsed so as to be in condition to receive a bag and, after passing the cam it automatically opens so as to engage with the sides of the bag and stretch its mouth open. Then as the holders reach the cam 24 they are partially collapsed to relieve them of the tension of the stretched bags so that as each holder arrives at the cam 25 it is in condition to have its hinged members lifted to carry the bag-engaging devices out of the bag. The bags on the holders are filled while passing from the cam 23 to the cam 24, they being held in an expanded condition during this portion of their travel. Consequently when the cam 24 is reached the bags are ready to be released from the holders, such release being effected by means of the cams 24 and 25.

In order that the holders need not carry the total weight of filled bags I provide a suitable support on the front side of the machine, the support being located below the holders at such a distance that bags on the holders will rest thereon, and the support being preferably movable in synchronism with the conveyer so that there is no tilting stress imposed upon the bags. I prefer to make the movable support in the form of an endless belt as indicated at 26. Since the machine is adapted to handle bags of various sizes and depths, the supporting belt must be adjustable in the vertical direction and I accomplish this by mounting it on suitable supports which are adjustable vertically upon the frame. In the arrangement shown, (see Figs. 1 and 8 to 10) the supporting frame is provided at opposite ends with elongated vertical slots 27 in which are mounted slidable brackets 28. The brackets may conveniently be held in place by means of studs 29 passing through the slots and into the brackets, washers 30 being placed beneath the heads of the studs and the frame so that portions of the frame are clamped between the bracket and the washers when the studs are tightened. In each of the brackets is journaled the shaft of one of the supporting pulleys 31 around which the belt 26 passes. By loosening the studs, the pulleys may be raised and lowered, thus bringing the supporting belt in the proper position to support the bags which are being handled. Since the belt and its pulleys have considerable weight, I prefer to counterbalance them either wholly or partially; this being conveniently accomplished by connecting to each of the brackets 28 one end of a sprocket chain 32 which passes over a suitable sprocket wheel 33 carried by the frame of the machine and carries on its other end the counterweight 34. The weights are preferably made not heavy enough to completely overbalance the supporting belt so that the belt may be locked in any adjusted position by means of pawls and ratchets 35 as indicated in Figs. 1 and 2, the pawls and ratchets preventing the belt from dropping.

It is advisable to tap the bags so as to vibrate them during the filling operation and thus cause their contents to settle before the bags are tied or sewed shut. To this end I have provided a suitable tapping mechanism which may be mounted on the underside of a table 36 which extends between the supporting pulleys for the belt and supports the upper half of the belt. This mechanism is best shown in Figs. 1 and 7. Referring to these figures, 37 and 38 are two hangers secured on the underside of the plank or support 36 at a distance apart equal approximately to the distance between the centers of three consecutive bag holders. In each of the hangers is mounted a small shaft 39 having its middle portion eccentric as indicated at 40. On each eccentric portion 40 is arranged a vertical yoke 41 having its arms extending into recesses 42 in the underside of the table. The table or support is provided with elongated slots 43 extending therethrough from one hanger to the other and located directly above the arms of the yokes. In the slots 43 are the bars 44 which rest at their ends upon the arms of the yokes, being preferably pivotally connected to the yokes. By rotating the shafts 39, the yokes are vibrated up and down and the bars 44 are caused to tap the belt and thus produce a vibration of the belt and of any bags which may be resting upon it. The shafts 39 may conveniently be connected together by a sprocket chain drive 45, one of the shafts having on its outer end a pulley 46 by which it may be driven.

As the conveyer and belt travel, carrying bags with them, the rubbing of the bags on the supporting frame work might injure them and therefore, to prevent this, I provide an auxiliary belt 48 which may either be round or of any other cross-sectional area, this belt lying outside of the frame between the main supporting belt and the conveyer and traveling in synchronism with the main belt and the conveyer so that it may engage with the side of a bag and support it without allowing it to come in contact with the frame. In the arrangement shown, the auxiliary belt passes over small pulleys 49 and 50 on the ends of the frame somewhat beneath the conveyer and also passes around one end of one of the pulleys 31 so as to be driven thereby. As the main belt is raised and lowered, the auxiliary belt must be adjusted so as to maintain the proper tension. This may conveniently be accomplished by passing the auxiliary belt over a pulley or roller 51 adjustably mounted upon a bar 52 which is in turn adjustable on the frame. By removing a pin 53 which holds the bar to the frame, and moving the bar toward the right or left, slack may be taken out of the auxiliary belt or slack may be given to it as the conditions require. The frame is provided with a series of openings 54 through which the pin 53 may be inserted so as to hold the bar 52 in any desired position. Further adjustment of the belt is provided by moving the roller or pulley 51 along a slot 55 in the supporting bar.

The two belts and the conveyer may be driven in synchronism with each other by providing a common driving shaft, indicated as a vertical shaft 56 in Fig. 2. The upper end of this shaft may carry the sprocket wheel 2 of the conveyer mechanism, and splined to it (see particularly Fig. 10) is a bevel gear 57 meshing with a complementary gear 58 on the end of the shaft 59 which carries one of the pulleys 31 of the main belt. As the main belt is raised and lowered to adjust it, the gear wheel 57 slides up and down its shaft so as always to be in driving relation to its coöperating gear wheel.

In the machine which I have illustrated, the bags are adapted to be filled by an automatic weighing machine and therefore all of the parts of the bag handling mechanism should be positively supported so as to position the bags accurately. To this end an elaboration of the conveyer which I have not heretofore described is advisable. Referring to Figs. 1, 3 and 7 of the drawings it will be seen that the sprocket chain 4 rests upon flat guides or supports 60 on the main frame. Furthermore it is caused to travel in a predetermined path by means of rails 61 which are secured on the frame at opposite sides of the chain, the rails being spaced apart just far enough to permit the passage of the chain and leaving no room for lateral movement. Above the tracks or rails 61, and parallel therewith, is a second set 62 carried on the arms of suitable brackets 62$^a$ mounted upon the main frame. The members 9 on the bag holders, to which I have heretofore referred as nuts, may take the form of rollers which extend between the rails of the tracks 62 and are guided thereby. By this arrangement the conveyer and the bag holders thereon are compelled to move in accurate alinement so that the bags will always follow exactly a predetermined course.

As I have heretofore stated, in the arrangement illustrated it is contemplated that three bags will be filled simultaneously. To this end I place adjacent to the conveying apparatus a suitable weighing or measuring machine having three discharge outlets 63, 64 and 65, the spacing between the outlets being the same as that between the bag holders, and the outlets being positioned between the cams 23 and 24, viewing the machine from the front, and directly over the path followed by the bag holders at the front of the machine, viewing the machine from the end. Therefore if the conveyer is stopped with three of its holders directly beneath the three discharge outlets from the weighing machine, bags on these holders may receive charges simultaneously. The tapping or vibrating mechanism is provided with a driving pulley which is independent of the main driving shaft for the belts and the conveyers and therefore the mechanism for moving the bags may be stopped without stopping the vibrating mechanism, so that the supporting belt and the bags thereon may be vibrated while the charges are flowing into the bags.

The weighing or measuring machine may take any suitable form and may be connected with the conveying apparatus in any suitable way. In the arrangement shown the weighing machine is a separate unit which is simply placed in proximity to the conveying apparatus. In order to make the operation of filling the bags automatic some means must be provided for controlling the conveying apparatus by means of the weighing mechanism so that bags will be moved in position while the weighing machine is measuring the charges, and will be brought to rest beneath the discharge outlets when the weighing machine is ready to deliver the charges. The weighing machine illustrated in the drawings is one adapted to be driven by power, the machine having a driving pulley 66 which may be clutched to and unclutched from the main shaft 67 of the weighing machine by a suitable manually controlled clutch 68. The pulley 66 is continuously driven by means of a suitable belt 69 which is guided in any suitable manner so as to pass over a power driven pulley 70 carried by the main frame 1. The pulley 70 is fixed to a driven gear 71 so as to rotate therewith, the gear being in turn driven by a pinion 72 mounted on a suitable power shaft 73 below the gear 71 and the driven pulley 70. As long as the power shaft 73 rotates, the driving pulley 66 of the weighing machine will rotate and the weighing machine may be caused to operate by throwing in the clutch 68. The movement of the conveyer apparatus must be intermittent and under the control of the weighing machine. The power for driving the conveying apparatus is taken from the gear wheel 71 or a part connected thereto as will best be seen from Figs. 2 and 12. It will be seen that the main shaft 56 of the conveyer apparatus has thereon a bevel gear 74 which meshes with a complementary gear 75, the latter being the driving member. It will be seen in Fig. 12 that the bevel wheel 75 is fixed upon the end of a shaft 76 upon which the gear wheel 71 and the pulley 70 are revolubly supported. Unless the shaft is clutched to the gear wheel, it remains idle although the gear wheel is running. I have provided a clutch under the control of the weighing machine for alternately connecting the shaft to and disconnecting it from the gear wheel 71, this clutch being best shown in Figs. 12 to 16. The gear wheel 71 has an axial hub or extension 77 provided with a cup-shaped head 78 on its end. Around the interior of the cup-shaped head are a series of semi-circular grooves 79 extending parallel with the shaft 76. Fixed to the shaft 76 is a member 80 having a part 81 projecting into and revoluble in the cup-shaped head 78. In the member 80 is journaled a short shaft 82, half of which is cut away at the end which projects into the cup-shaped head so that when the shaft is in a predetermined angular position it does not interfere with free relative rotation between the members 78 and 80. When the shaft is turned out of the predetermined angular position it projects into one or the other of the grooves 79 in the head 78 and locks the members 78 and 80 together, consequently locking the shaft 76 to the gear 71 and causing it to rotate therewith. The shaft 82 consequently controls the conveying apparatus and, by rotating the shaft between a clutching position and an unclutching position, the conveying apparatus may be driven or stopped at will. In the arrangement shown the clutch shaft 82 is provided with a radial arm 84 back of which is a spring 85 tending normally to turn it so as to carry the clutch shaft into its clutching position. On the frame of the machine, see particularly Fig. 11, is a swinging lever 86 having a shoulder 87 for engaging with the arm 84 to hold it against rotation. The lever is provided with a counter-weight 88 tending to hold it in its operative position in the path of the arm 84, there being on the lever, if desired, a pin or finger 89 adapted to strike against a fixed stop or projection 90 so as to limit the swinging movement of the lever. The parts being in the positions indicated in Figs. 11 and 16, if the lever is swung so as to carry it clear of the clutch-controlling arm 84, the spring back of this arm throws it so as to carry the clutch shaft into clutching position and the driving shaft 72 will rotate, causing the conveying mechanism to operate. If the lever is released, it will swing back into the path of the arm 84 so that during the rotation of the parts the arm will strike against the shoulder 87 and will be arrested, the member 80, on which it is mounted continuing its rotation until the clutch shaft has assumed its inoperative position clear of the notches in the head 78. The shaft 76 is now unclutched from the driving mechanism and the conveyer comes to rest. The member 80 may be provided with a shoulder or projection 91 which is adapted to drop under a yielding dog 92 on the frame, so as to prevent backward movement of the parts, the dog engaging with the shoulder 91 at the same time that the arm 84 assumes its unclutching position; the member 80 being thus locked against movement in either direction until the controlling lever is again operated. The controlling lever may be actuated in any suitable way from the weighing machine. In the arrangement shown, the controlling lever is connected to one end of a rod or link 93 which is connected at its other end to one arm of a bell crank lever 94. From the other arm of the bell crank lever extends a rod 95 which is moved by a cam or eccentric 96 on the shaft 67 of the weighing machine. Consequently as the shaft 67 revolves it oscillates the rod 95 and through it the bell crank lever and the controlling lever for the clutch. By properly proportioning the parts the clutch will be thrown in and out so as to move the conveying apparatus while charges are being measured out by the weighing machine and to bring the conveying apparatus to rest with a bag under each of the discharge outlets of the weighing machine when the weighing machine is ready to deliver the discharges.

In Figs. 17 to 21 I have shown a modified form of bag holder adapted for use in connection with bags of cloth or the like. All of the parts except the bag-engaging devices are the same as in the other form, the bag-engaging devices taking the form of plates 100 having toothed or serrated ends as indicated at 101. When the plates are inserted in the mouth of the bag and are drawn apart so as to expand the mouth of the bag, the teeth or serrations enter the fabric and lock the bags firmly in place. In placing the bags on the engaging devices, if the teeth were left exposed, the bag might catch on the teeth before being brought into the desired position; furthermore, there would be some difficulty in detaching the bag from the holder. To avoid these objections and to make it easy to place the bag on the holder and remove it therefrom, I have provided each of the plates with guards for the teeth or serrations, these guards being yieldable so that when the bag is under tension they are pressed back out of the way and when the tension is removed they press the fabric of the bag away from the teeth and release it. In the arrangement shown each of the plates is provided with two guards 102 slidably mounted in suitable bearings 103 on the plates so as to be movable from a position in which they project beyond the teeth or serrations to a position in which they lie behind the teeth or cerrations. The guards on each plate are connected together by a suitable spring 104 which is under tension so that when free to do so it thrusts the two guards apart and causes them to project out beyond the teeth. In Fig. 21 I have illustrated the condition of the parts when the two bag-engaging devices of the holder are first inserted in the mouth of the bag 105. The guards 102 project out beyond the ends of the teeth and hold the fabric clear of the teeth. If the two bag-engaging members are now moved away from each other so as to stretch the bag, the condition illustrated in Fig. 20 is reached, the bag having forced the guards in and being gripped by the teeth. This spreading of the bag-engaging members is effected by the spring 10 between the supporting arms, as heretofore described. When a bag is to be placed in position, the fingers 19 on one of the holders are grasped and pressed together so as to carry the bag-engaging members toward each other, the bag is then slipped in place and the fingers released; whereupon the engaging members fly apart and cause the bag to be gripped as indicated in Fig. 20. When holders of this kind are placed on the machine, the cam 24 causes the bag-engaging parts of each holder to be moved toward each other, thus allowing the guards to spring out, and leaving the parts in condition to be withdrawn in the vertical direction through the lifting of the fingers 19 by the cam 25.

It will thus be seen that I have provided simple and reliable holding devices for bags of all kinds, and mechanism for automatically filling bags carried by the holders and then carrying the bags away and releasing them, if desired, to a suitable tying or sewing machine for closing them.

While I have illustrated and described in detail only a single embodiment of my invention I do not desire to be limited to the structural details thus illustrated and described; but intend to cover all forms and arrangements which fall within the terms employed in the definitions of my invention constituting the appended claims.

I claim:

1. In a machine of the character described, a bag-filling machine, a movable conveyer, a series of bag-holding devices secured to and distributed along the conveyer and each adapted to enter the mouth of a bag to expand the bag and hold it on the conveyer, means for moving said conveyer to carry the bags successively past said machine, means coöperating with said devices to collapse each device and lift it out of its bag after the bag has passed said machine, and a support for the bags lying beneath that portion of the conveyer extending between said machine and said means for engaging with the bottoms of the bags.

2. In combination, a bag-filling machine, a conveyer movable past said machine, a device normally secured on the conveyer and adapted to enter the mouth of a bag to expand the same and hold the bag on the conveyer, means on one side of the machine for collapsing said device to permit a bag to be placed thereon, means on the other side of the machine for collapsing said device and lifting it from the bag, a support lying underneath that portion of the conveyer extending between said machine and the collapsing and lifting means for said device for taking the weight of the filled bag from the conveyer and supporting the bag while said device is being lifted therefrom.

3. In combination, a bag-filling machine, a conveyer movable past said machine, a series of devices normally secured on the conveyer and each adapted to enter the mouth of a bag to expand it and hold the bag on the conveyer, a support below said conveyer lying parallel therewith and movable in the same direction as the conveyer, said support being adapted to engage with the bottom of the bags so as to relieve the conveyer of the weight of the contents of the bags, means on one side of the machine for collapsing said device to permit a bag to be placed thereon, means on the opposite side of the machine for collapsing said devices and lifting them from the bags, and means for moving said conveyer and said support in synchronism with each other.

4. In combination, a bag-filling machine, a conveyer movable past said machine, a device on said conveyer adapted to engage with a bag to hold it on the conveyer in an expanded condition, a belt lying below and parallel with said conveyer to support a bag held by said device, means for adjusting said belt so as to vary the distance between it and the conveyer, means for vibrating said belt, and means for moving said conveyer and said belt in synchronism with each other.

5. In combination, a frame, a movable conveyer carried by said frame, a bag-filling machine having a discharge outlet adjacent to said conveyer, a device on said conveyer adapted to engage with a bag to hold it on the conveyer in an expanded condition, a supporting belt mounted on said frame below and parallel with said conveyer to support a bag held by said device, a second belt lying between said conveyer and the supporting belt to engage with the side of the bag and hold it away from said frame, and means for moving said conveyer and said belts in synchronism with each other.

6. In combination, a frame, a bag-filling machine, a conveyer mounted on said frame and movable past said machine, a device on said conveyer adapted to engage with a bag to hold it on the conveyer in an expanded condition, a belt lying below and parallel with said conveyer to support a bag held by said device, vertically-adjustable supports for said belt mounted on said frame for the purpose of permitting the belt to be raised and lowered, counter-weights connected to said supports and partially counter-balancing said supports and belt, and means for locking said supports and said belt against the tendency to overbalance said counter-weights.

7. In combination, a frame, a bag-filling machine, a conveyer mounted on said frame and movable past said machine, a device on said conveyer adapted to engage with a bag to hold it on the conveyer in an expanded condition, a belt lying below and parallel with said conveyer to support a bag held by said device, vertically-adjustable supports for said belt mounted on said frame for the purpose of permitting the belt to be raised and lowered, counter-weights connected to said supports and partially counter-balancing said supports and belt, means for locking said supports and said belt against the tendency to overbalance said counter-weights, and means carried by said supports for vibrating the belt.

8. In combination, a frame, a movable conveyer carried by said frame, a bag-filling machine having a discharge outlet adjacent to said conveyer, a device on said conveyer adapted to engage with a bag to hold it on the conveyer in an expanded condition, a belt below and parallel with said conveyer for supporting a bag held by said device, vertically-adjustable means on said frame for supporting said belt, means carried by said supporting means for vibrating said belt, and means for moving said conveyer and said belts in synchronism with each other.

9. In combination, a bag-filling machine, a horizontal and horizontally-movable conveyer movable past said machine, a series of devices carried by and distributed along the conveyer and each adapted to enter the mouth of a bag to expand the same and hold the bag on the conveyer, a horizontal belt lying beneath said conveyer and at such a distance therefrom as to permit bags on said devices to rest upon the belt, means on one side of said machine for collapsing said devices to permit bags to be placed thereon, means on the other side of the machine for collapsing said devices and lifting them out of the bags, and means for moving said conveyer and said belt in synchronism.

10. In combination, a bag-filling machine, a horizontal and horizontally-movable conveyer movable past said machine, a series of devices carried by and distributed along the conveyer and each adapted to enter the mouth of a bag to expand the same and hold the bag on the conveyer, a horizontal belt lying beneath said conveyer and at such a distance therefrom as to permit bags on said devices to rest upon the belt, means on one side of the machine for collapsing said devices and lifting them out of the bags, and means for moving said conveyer and said belt in synchronism.

11. In combination, a bag-filling machine, an endless conveyer movable past said machine, a series of devices carried by and distributed along the conveyer and each adapted to engage with a bag to hold it on the conveyer in an expanded condition, means on one side of the machine for coöperating with said devices to place them in condition to receive the bags and simultaneously maintaining a plurality of said devices in said condition, means on the other side of the machine coöperating with said devices to release them from the bags after the bags have passed said machine, and means for moving said conveyer.

12. In combination, a bag-filling machine, an endless conveyer movable past said machine, a series of devices carried by and distributed along the conveyer and each adapted to enter the mouth of a bag to expand the same and hold it on the conveyer, means on one side of the machine for collapsing said devices to permit the bags to be placed thereon, means on the other side of the machine for collapsing said devices and lifting them from the bags, and means for moving said conveyer.

13. In a machine of the character described, an endless conveyer movable in a horizontal plane, a series of devices distributed along the conveyer and extending outwardly therefrom, means on the outer end of each of said devices adapted to engage with a bag to expand it and hold it on the conveyer, a movable endless belt lying below and parallel with one side of the conveyer, said belt being arranged at such a distance from the conveyer as to engage with the bottoms of bags held on said devices and relieve the conveyer of at least a part of the weight of the bags or their contents, and means for moving said belt and said conveyer in synchronism.

14. In combination, a bag-filling machine, an endless conveyer movable past said machine, a series of devices carried by and distributed along the conveyer and each adapted to engage with a bag to expand it and hold it on the conveyer, a movable endless belt below said conveyer for supporting bags held by said devices, pulleys revoluble about vertical axes for driving said conveyer, pulleys revoluble about horizontal axes for driving said belt, and means controlled by said machine for intermittently actuating said pulleys so as to drive said conveyer and said belt in synchronism with each other.

15. In a machine of the character described; a movable conveyer; a series of bag-holding devices each comprising two arms arranged adjacent to each other, a yielding connection between said arms, means for pivotally securing said arms to the conveyer so as to permit corresponding ends of the arms to project outwardly from the conveyer, a yielding connection between said arms, and bag-holding means on the outer ends of said arms; and a second conveyer lying below and parallel with a portion of the first conveyer and so spaced apart therefrom as to engage with the bottoms of a plurality of bags held upon said devices.

16. In combination, a bag-filling machine, a conveyer movable past said machine, a series of devices carried by and distributed along the conveyer and each adapted to expand a bag and hold it on the conveyer, means for engaging with the bottoms of bags on said devices for supporting the bags, means on one side of the machine for coöperating with said devices to place them in condition to receive bags, means on the other side of the machine for coöperating with said devices to first release them from the bags and then lift them out of the bags, and means for moving said conveyer.

17. In a machine of the character described, a conveyer, a series of bag-holding devices distributed along the conveyer and secured thereto so as to project laterally therefrom, each of said devices comprising two relatively-movable members, bag-engaging parts on corresponding ends of said members, means tending to hold said parts yieldingly apart, a cam adapted to engage with said devices to move the bag-engaging parts thereon toward each other, and means for moving said conveyer to carry said devices successively past said cam.

18. In a machine of the character described, a conveyer, a series of bag-holding devices distributed along the conveyer and secured thereto so as to project laterally therefrom, each of said devices comprising two relatively-movable members, and bag-engaging parts connected to the outer ends of said members so as to be movable in planes at right angles to the plane of the aforesaid relative movement between said members.

19. In a machine of the character described, a movable conveyer, a series of bag-holding devices secured to and distributed along the conveyer, each of said devices comprising two relatively movable members, bag-engaging parts connected to said members so as to be movable in planes at right angles to the plane of the aforesaid relative movement between said members, and means tending to hold said members yieldingly at one limit of their relative movement.

20. In a machine of the character described, a conveyer, two arms mounted on the conveyer and projecting laterally therefrom, at least one of said arms being pivoted so as to permit a relative movement between the free ends of the arms, and a bag-engaging member hinged upon the free end of each arm so as to have a movement in a direction at right angles to the plane of the aforesaid relative movement between said arms.

21. In a machine of the character described, a conveyer, two arms mounted on the conveyer and projecting laterally therefrom, at least one of said arms being pivoted so as to permit a relative movement between the free ends of the arms, a bag-engaging member hinged upon the free end of each arm so as to have a movement in a direction at right angles to the plane of the aforesaid relative movement between said arms, and a spring between said arms tending to hold them at one limit of their relative movement.

22. In a machine of the character described, a movable conveyer, and two members secured to said conveyer so as to permit relative movements from and toward each other and also movements in a direction at right angles to the plane of such relative movement, and bag-engaging parts mounted on corresponding ends of said members.

23. In a machine of the character described, a movable conveyer, two members secured to said conveyer so as to permit relative movements from and toward each other and also movements in a direction at right angles to the plane of such relative movement, bag-engaging parts mounted on corresponding ends of said members, and means tending to hold said members yieldingly at one limit of the aforesaid relative movements.

24. In a machine of the character described, a conveyer, two arms pivoted to said conveyer so as to permit relative movements of their free ends from and toward each other, members hinged upon the free ends of said arms so as to be movable at right angles to the plane of the aforesaid relative movement, and bag-engaging parts on said members.

25. In a machine of the character described, a conveyer, two arms pivoted to said conveyer so as to permit relative movements of their free ends from and toward each other, members hinged upon the free ends of said arms so as to be movable at right angles to the plane of the aforesaid relative movement, and bag-engaging parts adjustably mounted on said members.

26. In a machine of the character described, a conveyer, two arms pivoted to said conveyer so as to permit relative movements of their free ends from and toward each other, members hinged upon the free ends of said arms so as to be movable at right angles to the plane of the aforesaid relative movement, bag-engaging parts on said members, means for yieldingly holding said arms apart, a cam adapted to engage with one of said arms to move the arms toward each other, and means for moving said conveyer to carry said arms past said cam.

27. In a machine of the character described, a conveyer, two arms pivoted to said conveyer so as to permit relative movements of their free ends from and toward each other, members hinged upon the free ends of said arms so as to be movable at right angles to the plane of the aforesaid relative movement, bag-engaging parts on said members, means for yieldingly holding said arms apart, a cam adapted to engage with one of said arms to move the arms toward each other, a cam adapted to lift said members, and means for moving said conveyer past said cams.

28. In a machine of the character described, a movable conveyer, two arms mounted on the conveyer so as to be movable therewith and project laterally therefrom, at least one of said arms being pivoted so as to permit a relative movement between the outer ends of the arms, bag-engaging members mounted upon the outer ends of said arms so as to be movable in a direction at right angles to the aforesaid relative movement between said arms, means for moving said arms toward each other, and means for acting on said bag-engaging members to move them relative to the arms.

29. In a machine of the character described, a movable conveyer, a series of bag-holding devices secured to and distributed along the conveyer, each of said devices comprising two relatively movable members projecting laterally from the conveyer, bag-engaging parts connected to the outer ends of said members so as to be movable in planes at right angles to the plane of the aforesaid relative movements between said members, said bag-engaging parts being constructed and arranged to fit within the mouth of the bag to expand the same, and a spring between said members for holding them in a position wherein a bag on said bag-engaging parts is fully expanded and held on the conveyer by said bag-engaging parts.

30. In combination, a bag-filling machine having a plurality of discharge outlets, an endless conveyer movable past said machine, a series of devices carried by and distributed along the conveyer, and each adapted to engage with a bag to hold it on the conveyer in an expanded condition, the spacing between the devices on the conveyer being the same as the spacing between said outlets, means on one side of the machine for coöperating with said devices to place them in condition to receive the bags and simultaneously maintaining a plurality of said devices in said condition, means on the other side of the machine coöperating with said devices to release them from the bags after the bags have passed said machine, and means controlled by said machine for intermittently feeding said conveyer so as at each operation to bring a new set of bags in proximity to said discharge outlets.

31. In combination, a conveyer, two members mounted on the conveyer so as to project laterally therefrom, for relative movements from and toward each other and also movements in planes at right angles to the plane of said relative movements, parts carried upon the outer ends of said members and shaped to fit within the mouth of a bag, means acting on said members and tending normally to press said parts away from each other a distance greater than the width of the expanded mouth of a bag on said parts.

32. In combination, a conveyer, two members mounted on the conveyer so as to project laterally therefrom for relative movements from and toward each other and also movements in planes at right angles to the plane of said relative movements, parts carried upon the outer ends of said members and shaped to fit within the mouth of a bag, means acting on said members and tending normally to press said parts away from each other a distance greater than the width of the expanded mouth of a bag on said parts, said parts being adjustable from and toward each other relative to said members.

33. In combination, a conveyer, a series of bag-holding devices distributed along said conveyer, each of said devices comprising two arms projecting laterally from the conveyer and connected thereto so as to be movable about two axes transverse to each other, members depending from the outer ends of said arms and shaped to fit within the mouth of a bag and hold it expanded, means for normally holding said arms so as to impose a considerable tension upon a bag surrounding said members.

34. In combination, a conveyer, a series of bag-holding devices distributed along said conveyer, each of said devices comprising two arms projecting laterally from the conveyer and connected thereto so as to be movable about two axes transverse to each other, members depending from the outer ends of said arms and shaped to fit within the mouth of a bag and hold it expanded, means for normally holding said arms so as to impose a considerable tension upon a bag surrounding said members, and means adjacent to said conveyer for swinging said arms about both sets of axes so as to release the tension on bags held on said device and lift the devices out of the bags.

35. A bag-holding device comprising two members movable from and toward each other, parts depending from corresponding ends of said members and shaped to fit within and expand the mouth of a bag, and a spring between said members tending to hold the aforesaid ends farther apart than is permitted by a bag surrounding said bag-engaging parts so as to place a bag held on the device under considerable tension, said bag-engaging parts being adjustable on said members from and toward each other to adapt the device to bags of different sizes.

36. In combination, an endless conveyer having an elongated straight portion, a bag-filling machine in proximity to said portion of the conveyer, a series of bag-holding devices distributed along said conveyer and spaced apart such distances as to bring a considerable number thereof along the straight portion, said bag-filling machine having a series of discharge outlets spaced apart the same distance as that between the bag-holding devices, means on one side of the machine for simultaneously placing a plurality of said bag-holding devices along said straight portion of the conveyer in a bag-receiving condition, and means on said other side of the machine for placing each device in a bag-releasing condition as it passes that point, and means controlled by said machine for feeding said conveyer step by step so as to bring a new group of bag-holding devices into proximity to said discharge outlets at each operation.

37. In combination, an endless conveyer having an elongated straight portion, a bag-filling machine in proximity to said portion of the conveyer, a series of bag-holding devices distributed along said conveyer and spaced apart such distances as to bring a considerable number thereof along the straight portion, said bag-filling machine having a series of discharge outlets spaced apart the same distance as that between the bag-holding devices, means on one side of the machine for simultaneously placing a plurality of said bag-holding devices along said straight portion of the conveyer in a bag-receiving condition, means on said other side of the machine for placing each device in a bag-releasing condition as it passes that point, means controlled by said machine for feeding said conveyer step by step so as to bring a new group of bag-holding devices into proximity to said discharge outlets at each operation, and a horizontal belt lying below and parallel with said straight portion of the conveyer to support the weight of the filled bags.

In testimony whereof, I sign this specification in the presence of two witnesses.

GEORGE HOEPNER.

Witnesses:
  WM. F. FRENDENREICH,
  RUBY V. BRYDGES.